United States Patent [19]

Ohta et al.

[11] Patent Number: 5,499,226
[45] Date of Patent: Mar. 12, 1996

[54] OPTICAL INFORMATION REPRODUCTION APPARATUS AND OPTICAL INFORMATION REPRODUCTION METHOD

[75] Inventors: Shinichi Ohta; Hiroto Kitai, both of Tokyo, Japan

[73] Assignee: Canon Kabushiki Kaisha, Tokyo, Japan

[21] Appl. No.: 163,689

[22] Filed: Dec. 9, 1993

[30] Foreign Application Priority Data

Dec. 11, 1992 [JP] Japan ..................... 4-352460

[51] Int. Cl.$^6$ ................. G11B 5/00; H04N 5/76
[52] U.S. Cl. ..................... 369/59; 360/32
[58] Field of Search ................. 360/51, 46, 32, 360/48, 49; 369/59, 53, 50, 44.26; 235/454, 455, 469

[56] References Cited

U.S. PATENT DOCUMENTS

| | | | |
|---|---|---|---|
| 4,390,801 | 6/1983 | Kurata et al. | 307/409 |
| 4,952,786 | 8/1990 | Inoue | 235/454 X |
| 4,958,339 | 9/1990 | Kayama et al. | 235/454 X |
| 4,984,227 | 1/1991 | Yoshimaru | 369/59 X |
| 5,018,124 | 5/1991 | Ogasawara et al. | 235/454 X |
| 5,053,610 | 10/1991 | Horie | 235/454 |
| 5,062,091 | 10/1991 | Maede et al. | 369/59 X |
| 5,063,546 | 11/1991 | Ito et al. | 369/50 X |
| 5,093,820 | 3/1992 | Maeda | 369/50 |
| 5,157,645 | 10/1992 | Takahara et al. | 369/59 X |
| 5,165,089 | 11/1992 | Jaquette et al. | 369/59 |
| 5,177,719 | 1/1993 | Yamada et al. | 369/59 X |
| 5,191,566 | 3/1993 | Yamaguchi et al. | 369/54 X |
| 5,233,589 | 8/1993 | Saito et al. | 369/59 X |
| 5,253,246 | 10/1993 | Bailey | 369/59 |
| 5,267,226 | 11/1993 | Matsuoka et al. | 235/454 X |
| 5,285,433 | 2/1994 | Oshiba et al. | 369/44.26 |

FOREIGN PATENT DOCUMENTS

| | | |
|---|---|---|
| 0242576 | 10/1987 | European Pat. Off. . |
| 0407094 | 1/1991 | European Pat. Off. . |
| 04341928 | 11/1992 | Japan . |
| 8703131 | 5/1987 | WIPO .................... 235/454 |

OTHER PUBLICATIONS

Patent Abstracts of Japan, Kokai No. 4–90168, vol. 16, No. 317, Jul. 1992.
Patent Abstracts of Japan, Kokai No. 59–217217, vol. 9, No. 90, Apr. 1985.

*Primary Examiner*—Donald T. Hajec
*Assistant Examiner*—Thien Minh Le
*Attorney, Agent, or Firm*—Fitzpatrick, Cella, Harper & Scinto

[57] ABSTRACT

In an optical information reproduction apparatus, digital information recorded as an optical mark on an optical information recording medium is reproduced in the following manner. A light beam is applied to the recording medium, and the obtained reproduction signal is binarized. The binary reproduction signal is sampled by a sampling clock which is generated by a PLL control signal generator, and is synchronized with the binary reproduction signal so as to reproduce the digital information. The PLL control signal generator achieves synchronization based on the leading and trailing edges of a change point of the binary reproduction signal.

18 Claims, 16 Drawing Sheets

OPTICAL INFORMATION REPRODUCTION APPARATUS AND OPTICAL INFORMATION REPRODUCTION METHOD

BACKGROUND OF THE INVENTION

1. Field of the Invention

The present invention relates to an optical information reproduction apparatus for reproducing digital information recorded on an optical information recording medium and, more particularly, to a reproduction signal processing apparatus for reproducing digital information by sampling a reproduced binary reproduction signal in response to clock signals.

2. Related Background Art

Conventionally, as recording media on and from which information is recorded and read out using light, various forms of media such as a disk-shaped medium, a card-shaped medium, a tape-shaped medium, and the like are known. These optical information recording media include a medium which allows both recording and reproduction, a medium which allows only reproduction, and the like. In particular, since an optical card as a recording medium has many features such as easy manufacture, good portability, high accessibility, and the like, its application range is expected to widen. Various optical information recording/reproduction apparatuses for the optical card have been proposed.

In such an optical information recording/reproduction apparatus, recording/reproduction is executed while executing auto-tracking control and auto-focusing control all the time. Information is recorded on a recording medium by scanning an information track with a light beam which is modulated according to recording information and is focused to a very small spot. In this case, a series of information is recorded as an information pit array which can be optically detected. Furthermore, information is reproduced from a recording medium by scanning the information bit array on the information track with a light beam spot which has a predetermined power low enough not to cause recording, and by detecting light reflected by or transmitted through the medium.

FIG. 1 shows an example of such an information recording/reproduction system. In the system shown in FIG. 1, a light beam emitted from a semiconductor laser 101 is collimated by a collimator lens 102, and is then split into a plurality of light beams by a diffraction grating 103. The split light beams are focused on an optical card 107 via a polarization beam splitter 104, a quarterwave plate 105, and an objective lens 106. Light reflected by the optical card 107 is incident on a photodetector 109 via the objective lens 106, the quarterwave plate 105, the polarization beam splitter 104, and a toric lens 108. At this time, of the light beams split by the diffraction grating 103, a 0th-order diffracted light beam is used for performing recording, reproduction, and auto-focusing control (to be abbreviated as AF hereinafter), and ±1st-order diffracted light beams are used for performing auto-tracking control (to be abbreviated as AT hereinafter). The AF adopts an astigmatism method, and the AT adopts a 3-beam method.

Part (a) of FIG. 2 is a schematic plan view of the optical card. A large number of parallel information recording/reproduction tracks are formed on the optical card 107, and some (T1, T2, and T3) of these tracks are illustrated. These tracks are separated by tracking tracks tt1 to tt4. The tracking tracks tt1 to tt4 consist of a material having a different reflectance from that of the grooves or tracks T1 to T3, and are used as guides for obtaining a tracking signal. Part (a) of FIG. 2 shows a case wherein information is recorded on or reproduced from the track T3. In this case, a 0th-order diffracted light beam 110 for recording, reproduction, and AF is radiated on the track T3, and ±1st-order diffracted light beams 111 and 112 for AT are respectively radiated on the tracking tracks tt3 and tt4. A tracking signal to be described later is obtained from reflected light beams of the diffracted beams 111 and 112, and the AT is executed based on the tracking signal, so that the 0th-order diffracted light beam 110 correctly scans on the track T3. The diffracted light beams 110, 111, and 112 are scanned on the optical card 107 by a mechanism (not shown) in the right-and-left direction on the plane of drawing of part (a) of FIG. 2 while maintaining a predetermined positional relationship.

This scanning system includes a system for moving an optical system, and a system for moving the optical card. In either system, since the optical system and the optical card are reciprocally moved relative to each other, a non-uniform speed portion appears at the two end portions of the optical card. Part (b) of FIG. 2 shows this state. The abscissa of part (b) of FIG. 2 represents the right-and-left direction of the optical card, and the ordinate represents the scanning velocity. Normally, a constant scanning region at the central portion of the optical card 107 is used as a recording region.

FIG. 3 is a partial enlarged view of the diffracted light beams 110 to 112 shown in part (a) of FIG. 2. The 0th-order diffracted light beam 110 for recording, reproduction, and AF is located at the central position between the ±1st-order diffracted light beams 111 and 112 for AT, and scans the center of the track T3. Hatched portions 113a, 113b, and 113c are normally called pits which are recorded by the 0th-order diffracted light beam 110. Since the pits 113a, 113b, and 113c have a different reflectance from that of the surrounding portion, when they are scanned with a weak light spot, reflected light of the light spot is modulated by the pits 113a, 113b, and 113c, thus obtaining a reproduction signal.

FIG. 4 is a circuit diagram showing the details of the photodetector 109 shown in FIG. 1, and a signal processing circuit. Referring to FIG. 4, the photodetector 109 shown in FIG. 1 comprises a total of six photosensor portions, i.e., 4-split photosensors 114 and photosensors 115 and 116. Light spots 110a, 111a, and 112a represent reflected light beams from the optical card 107 of the diffracted light beams 110, 111, and 112 in part (a) of FIG. 2 and FIG. 3. The light spot 110a is focused on the 4-split photosensors 114, and the light spots 111a and 112a are respectively focused on the photosensors 115 and 116. The outputs from the diagonal 4-split sensors 114 are respectively added by adders 117 and 118.

The outputs from the adders 117 and 118 are added by an adder 121 to reproduce an information reproduction signal RF. More specifically, the signal RF corresponds to the sum of all the portions of the light spot 110a focused on the 4-split photosensors 114. The output from the adder 118 is subtracted from the adder 117 by a differential circuit 120 to obtain a focusing control signal Af. The signal Af corresponds to a difference between the sums of the diagonal 4-split photosensors 114. Since the astigmatism method is described in detail in other references, a detailed description thereof will be omitted. The output from the photosensor 116 is subtracted from the output from the photosensor 115 by a differential circuit 119 to obtain a tracking control signal At. Normally, control is made to set At to be zero. With this control, tracking control for scanning the light spot to follow the information track is attained.

The signal RF obtained in this manner is binarized to be recognized as digital information, and is subjected to, e.g., processing for synchronizing the signal RF with a clock signal. FIG. 5(a) is a circuit diagram showing an example of this processing circuit, and FIG. 6 is a timing chart showing signals of the respective units in FIG. 5(a) through 5(c). The output RF from the adder 121 (FIG. 4) is input to the inverting input terminal of a comparator 122 of FIG. 5(a), and is compared with a reference voltage ref1 to generate a binary reproduction signal RF2. The reproduction signal RF2 is input to a D-type flip-flop 123, and is sampled in response to a sampling clock SC which is generated by a PLL control signal generator including components 124 to 127 (to be described later), and is substantially synchronous with the signal RF2 so as to compensate for a variation in scanning velocity. The sampled reproduction signal RF is generated as signal data synchronized with the sampling clock SC. Thereafter, in general, the signal data is stored in a buffer memory under the control of the sampling clock SC. The stored signal data is demodulated by a demodulator (not shown), and is recognized as digital information (reproduction data).

On the other hand, in order to substantially synchronize the sampling clock SC with the binary reproduction signal RF2, the binary reproduction signal RF2 and the sampling clock SC are input to a phase comparator 124. FIG. 5(b) is a circuit diagram showing the detailed circuit arrangement of the phase comparator 124. The binary reproduction signal RF2 is input to the clock terminal of a D-type flip-flop 128, and outputs Q and Q' (Q' is the inverted output of Q) of the flip-flop 128 are respectively set at high and low levels. The non-inverted output Q the flip-flop 128 is input to the data terminal of a flip-flop 129, and the sampling clock SC is input to the clock terminal of the flip-flop 129. When the non-inverted output Q from the flip-flop 128 is at high level, outputs Q and Q' from the flip-flop 129 are respectively set at high and low levels.

The inverted output Q' from the flip-flop 129 is connected to the reset terminal of the flip-flop 128 to reset the flip-flop 128. Thus, the output Q from the flip-flop 128 goes to low level, and the outputs Q and Q' from the flip-flip 129 are respectively inverted to low and high levels in response to the next sampling clock SC. Therefore, the flip-flop 128 outputs a phase difference (time difference) pulse from the leading edge of the binary reproduction signal RF2 to the leading edge of the sampling clock SC, and the flip-flop 129 outputs a pulse for one period of the sampling clock SC after the binary reproduction signal RF2 rises. When the pulse for one period and the sampling clock SC are gated by an AND gate 130, a half-period pulse D is output.

This processing will be described in detail below. When the phase of the binary reproduction signal RF2 coincides with the sampling clock SC, the width of the pulse output from the flip-flop 128 corresponds to half the period of the sampling clock SC. When the phase of the sampling clock SC is delayed from that of the binary reproduction signal RF, this pulse width becomes longer than the half period; when the phase of the sampling clock SC advances from that of the binary reproduction signal RF, this pulse width becomes shorter than the half period. Therefore, an output U or U' (U' is the inverted output of U) from the flip-flop 128 can be used as a phase delay signal, i.e., a signal for increasing the frequency of the sampling clock SC, and an output D from the AND gate 130 can be used as a phase advance signal, i.e., a signal for decreasing the frequency of the sampling clock SC. In other words, the phase difference of the sampling clock SC from the binary reproduction signal RF2 is represented by the pulse width of the output U or U' from the flip-flop 128, and in this case, in order to discriminate the phase delay or advance, the output D, as the half period pulse of the sampling clock SC, from the AND gate 130 is referred to.

In order to reproduce information from a medium on which information is recorded as the length of a pit or the interval between each two adjacent pits, as described above, the period of the sampling clock SC must be equal to a minimum pit length (to be referred to as 1T hereinafter). When the pit length or interval is larger than 1T, although the sampling clock SC is input at a 1T period, the binary reproduction signal RF2 does not change, and a phase comparison with each sampling clock SC cannot be performed. Thus, in the case shown in FIG. 5(b), a phase comparison with the sampling clock SC is performed at only the leading edge of the binary reproduction signal RF2. In order to realize this operation, an SR flip-flop, which is set in response to the binary reproduction signal RF2, and is reset in response to the sampling clock SC, is required. In FIG. 5(b), this SR flip-flop operation is attained by feeding back the inverted output Q' from the D-type flip-flop 129 to the reset terminal of the flip-flop 128.

The two outputs U' and D from the phase comparator 124 are input to a charge pump/loop filter 125. FIG. 5(c) is a detailed circuit diagram of the most typical charge pump/loop filter 125. Since an operational amplifier 131 receives a reference voltage ref2, when the levels of both the two outputs U' and D 10 from the phase comparator 124 are lower than that of the reference voltage ref2, an electric charge from the output from the amplifier 131 is charged on a capacitor C1 via the capacitor C1, resistors R3 and R1, and a diode D1, and the output from the amplifier 131 becomes high. At this time, since the direction of the diode D2 is opposite to an input D, no current flows to the input D. Conversely, when the levels of both the two outputs U' and D from the phase comparator 124 are higher than that of the reference voltage ref2, a current flows from the input D to the output of the amplifier 131 via a diode D2, resistors R2 and R3, and the capacitor C1, an electric charge is discharged from the capacitor C1 in a direction opposite to the above-mentioned direction, and the output from the amplifier 131 becomes low. In this case, when the resistors R1 and R2 are set to have the same resistance, the difference between the charge and discharge amounts of the capacitor C1 is proportional to the difference between the pulse widths of the two outputs from the phase comparator 124. More specifically, when the pulse widths of the outputs U' and D from the phase comparator 124 are equal to each other, an output FC from the amplifier 131 is constant; when the pulse width of the output U' from the phase comparator 124 is larger than that of the output D, the output FC from the amplifier 131 becomes high; and when the pulse width of the output D from the phase comparator 124 is larger than that of the output U', the output FC from the amplifier 131 becomes low.

The output, obtained in this manner, from the charge pump/loop filter 125 is input to a frequency control terminal FC of the voltage-controlled oscillator (VCO) 126. As an example of the VCO 126, ICs such as SN74LS624 (trade name) available from Texas Instruments, Co., and the like are known, and these ICs output a signal of a frequency almost proportional to a frequency control input FC within a preset frequency range. The output from the VCO 126 is halved by the frequency demultiplier 127 to obtain a duty ratio of 1:1, thus generating a sampling clock SC. The generated sampling clock SC is fed back to the phase comparator 124, is used as a clock for sampling the binary reproduction signal RF2 by the flip-flop 123, and is also used as a control signal for, e.g., buffer memory control. More specifically, when the pulse width of the output U' from the phase comparator 124 is larger than that of the output D, the frequency of the sampling clock SC becomes high; when the pulse width of U' is smaller than that of D, the frequency of the sampling clock SC becomes low. When the pulse widths of the two outputs U' and D from the phase comparator 124 are equal to each other, the frequency of the sampling clock SC is left unchanged.

Note that 113d to 113f shown in FIG. 6 represent the same pits as the pits 113a to 113c shown in FIG. 3, which pits are optical marks having a lower reflectance than that of a surrounding portion. These pits often use not only an optical density difference but also diffraction of light caused by a three-dimensional pattern. The pit 113d shown in FIG. 6 is a minimum pit having a length of 1T, and the pit 113e has a length twice that of the minimum pit, i.e., 2T. The pits 113d and 113e are separated by a minimum interval of 1T, and the pits 113e and 113f are separated by an interval twice the minimum interval, i.e., 2T. FIG. 6 illustrates a case wherein the pit lengths and the pit intervals just have rated values. When the recording medium is moved relative to the light spot, and the pits are scanned by the light spot 110a in the direction of an arrow as in FIG. 3, since the pit portion has low reflectance, an RF signal shown in FIG. 6 is obtained. When the RF signal is compared with the reference voltage ref1 by the comparator 122 shown in FIG. 5(a), an inverted binary reproduction signal RF2 is obtained.

Part (a) of FIG. 6 illustrates a state wherein the binary reproduction signal RF2 is synchronized with the sampling clock SC. Each of the output signals U and D from the above-mentioned flip-flop 128 and the AND gate 130 has a pulse width half of the minimum pit length scanning time 1T, i.e., 0.5T. At this time, the leading edge of the sampling clock SC as a sampling point for sampling the binary reproduction signal RF2 is located at the center of each pit and each pit interval, and the margin for a variation in scanning velocity of the light spot is maximum. Part (b) of FIG. 6 illustrates a case wherein the sampling clock SC is delayed by 0.25T (25%) from the binary reproduction signal RF2. In this case, the above-mentioned circuit operates to increase the pulse width of the output U from the flip-flop 128 to be larger by 0.25T than the output D from the AND gate 130 so as to increase the frequency of the sampling clock SC, so that the sampling clock SC catches up with the binary reproduction signal RF2. Conversely, part (c) of FIG. 6 illustrates a case wherein the sampling clock SC advances by 0.25T (25%) from the binary reproduction signal RF2. In this case, the above-mentioned circuit operates to decrease the pulse width of the output U from the flip-flop 128 to be smaller by 0.25T than the output D from the AND gate 130 so as to decrease the frequency of the sampling clock SC, so that the sampling clock SC is adjusted backward to the binary reproduction signal RF2. In the above-mentioned cases shown in FIG. 6, since the pit lengths and intervals have rated values, and the margin at that time is 0.5T (50%), even when the clock SC and the signal RF2 are shifted by 0.25T (25%), as shown in parts (b) and (c) of FIG. 6, data 1T, 1T, 2T, and 2T can be precisely reproduced.

However, actual pit lengths and intervals do not always have rated values, and change due to various causes. For example, when a pit is formed on an optical recording medium by a light spot, the pit size varies depending on the intensity of the light spot. Even when the intensity of the light spot is set to be constant, the medium characteristics change due to a variation in environmental conditions, and the pit size also changes due to this cause. Furthermore, when a pit is pre-formatted in the manufacture of an optical recording medium, it is normally formed to have a three-dimensional pattern (protrusion/recess). In this case, the pit size changes due to manufacturing errors in mold formation or etching.

FIG. 7 shows a state wherein pits whose sizes change due to the above-mentioned causes are scanned by a light spot. Part (a) of FIG. 7 shows a case wherein the pit lengths and intervals have rated values as in FIG. 6, part (b) of FIG. 7 shows a case wherein the pit length is smaller by 0.25T (25%) than the rated value, and part (c) of FIG. 7 shows a case wherein the pit length is larger by 0.25T (25%) than the rated value. In these cases, when the pit size changes due to the above-mentioned causes, the central position or center interval of the pits is left almost unchanged. Therefore, when the pit length decreases, the interval between the end portions of two adjacent pits increases; when the pit length increases, the interval decreases. Parts (b) and (c) of FIG. 7 show this relationship.

FIGS. 8 and 9 are timing charts obtained when the pits shown in parts (b) and (c) of FIG. 7 are scanned by the conventional apparatus shown in FIG. 5. FIG. 8 corresponds to part (b) of FIG. 7, and FIG. 9 corresponds to part (c) of FIG. 7. Part (a) of FIG. 8 shows a case wherein the binary reproduction signal RF2 is synchronized with the sampling clock SC, and the pulse width of the output U from the flip-flop 128 is equal to that of the output D from the AND gate 130. At this time, as is apparent from part (a) of FIG. 8, the sampling point of the sampling clock SC is present at a position separated by 0.5T from the leading end of the pit, and the margin to the trailing end of the pit is only 0.25T. In this case, as shown in part (b) of FIG. 8, when the sampling clock SC is delayed by 0.25T (25%) from the binary reproduction signal RF2, the sampling point of the sampling clock SC is located at a position immediately before the trailing end of the pit. For this reason, when the sampling clock SC is delayed by a time longer than 0.25T (25%) even slightly, it samples not the pit but an interval portion. As a result, as indicated by DATA in part (b) of FIG. 8, original data indicated by a broken line is lost, and wrong data is sampled.

When the pit size increases, as shown in part (a) of FIG. 9, the margin of the interval portion becomes 0.25T (25%). As a result, as shown in part (b) of FIG. 9, when the sampling clock SC advances by 0.25T (25%) from the binary reproduction signal RF2, the sampling clock SC samples not the interval portion but a pit portion, thus obtaining wrong data. In this manner, in the conventional apparatus, the pit size varies by various causes, and the variation margin of 0.5T between the binary reproduction signal and the sampling clock decreases by an amount corresponding to the pit size change. Therefore, original data cannot be reproduced, or a wrong portion is sampled, and wrong data is reproduced.

SUMMARY OF THE INVENTION

The present invention has been made in consideration of the above situation, and has as its object to provide an optical information reproduction apparatus and method, which can reduce a decrease in margin caused by a variation in scanning velocity of a light spot with respect to a change in pit size, and can reproduce recorded information with high reliability.

In order to achieve the above object, according to the present invention, there is provided an optical information reproduction apparatus or method in which digital information recorded as an optical mark on an optical information recording medium is reproduced by radiating a light beam, the obtained reproduction signal is binarized, and the binary reproduction signal is sampled by a sampling clock which is generated by a PLL control signal generator, and is synchronized with the binary reproduction signal so as to reproduce the digital information, wherein the PLL control signal generator achieves synchronization based on the leading and trailing edges of a change point of the binary reproduction signal.

Other features of the present invention will become apparent from the following discussion.

DETAILED DESCRIPTION OF THE PREFERRED EMBODIMENTS

Figure 10:
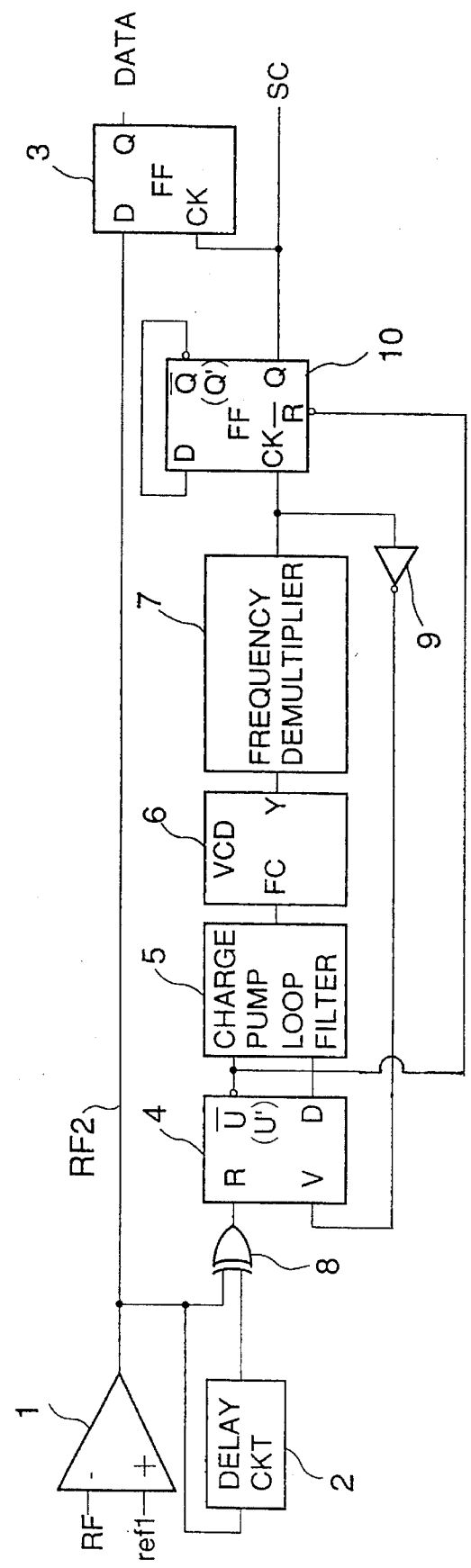
FIG. 10 is a circuit diagram showing an optical information reproduction apparatus according to the first embodiment of the present invention.

The preferred embodiments of the present invention will be described in detail hereinafter with reference to the accompanying drawings. An optical information reproduction apparatus according to the first embodiment of the present invention will be described below with reference to FIG. 10. Note that FIG. 10 shows an arrangement of a signal reproduction system as the main part of the present invention, i.e., a signal reproduction apparatus for synchronizing a reproduction signal using a sampling clock signal generated by a PLL control signal generator. Referring to FIG. 10, a comparator 1 binarizes a reproduction signal by comparing a reproduction signal RF read out from an optical information recording medium such as a card- or disk-shaped medium (not shown) with a reference voltage ref1. The output from the comparator 1 is output as a binary reproduction signal RF2. A D-type flip-flop 3 samples the binary reproduction signal RF2 by a sampling clock SC to generate signal data synchronized with the sampling clock SC. A PLL control signal generator is constituted by a phase comparator 4, a charge pump/loop filter 5, a voltage-controlled oscillator (VCO) 6, and a frequency demultiplier 7.

Figure 1:
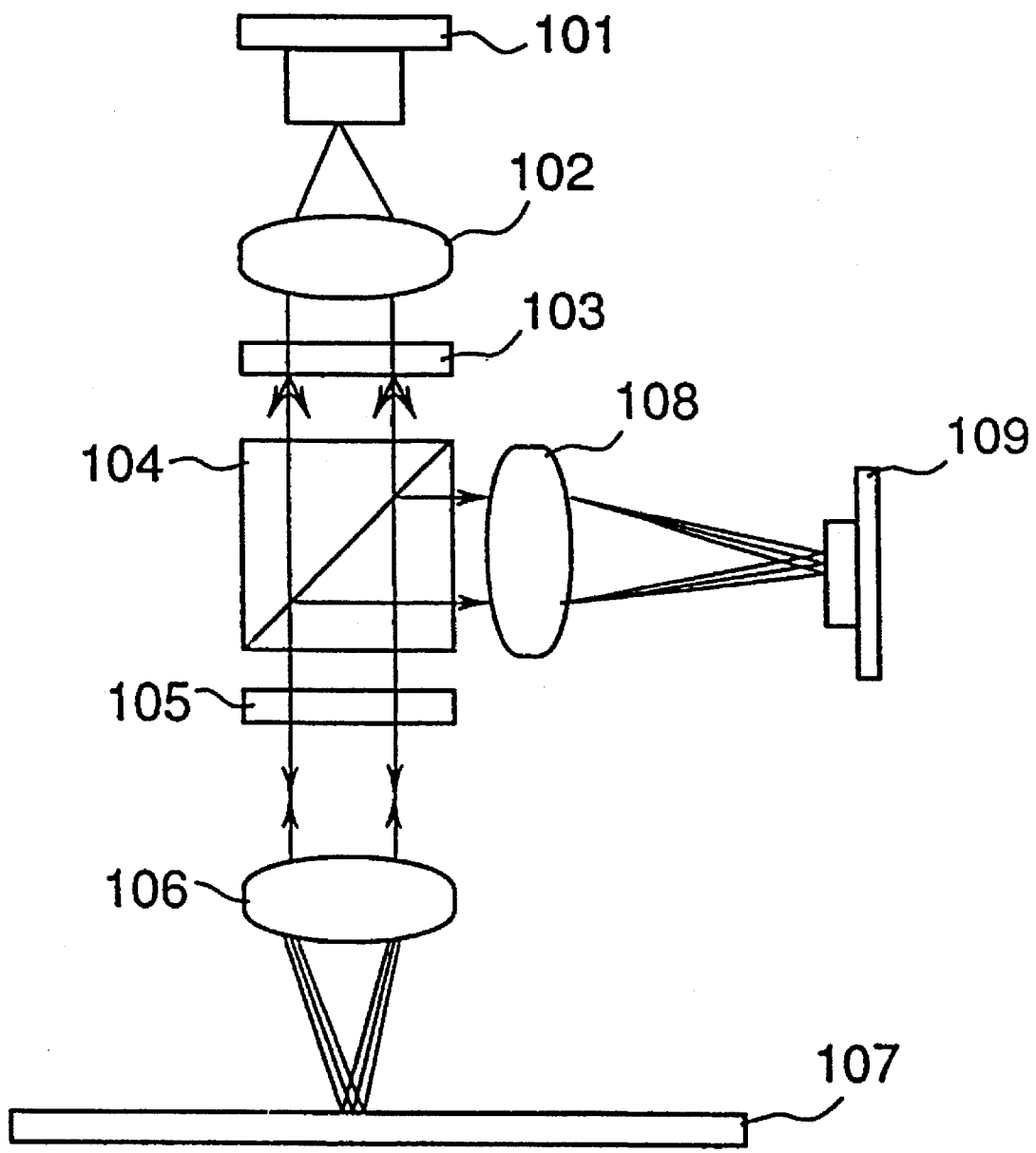
FIG. 1 is a schematic view showing an arrangement of an optical system of a typical optical card recording/reproduction apparatus.
Figure 2:
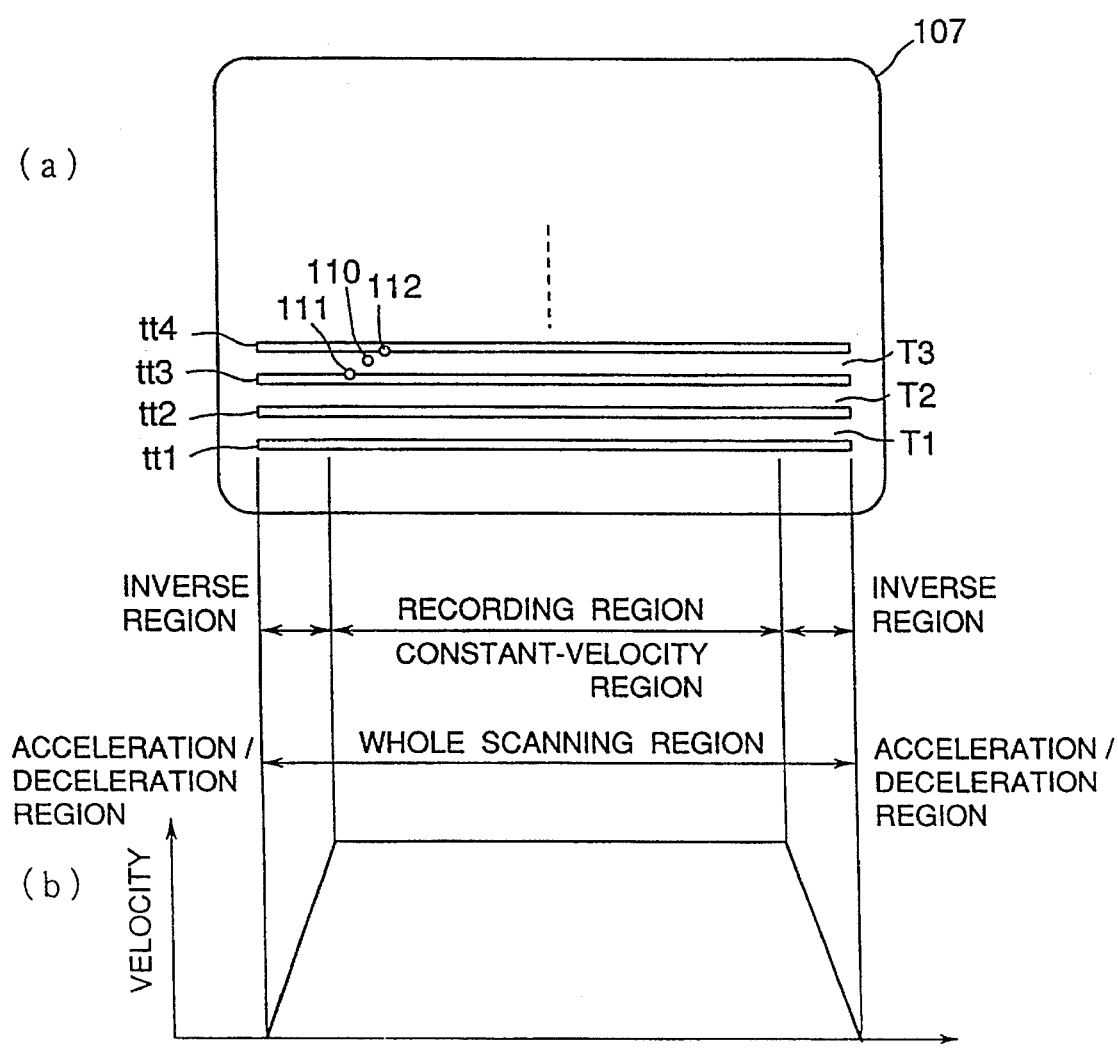
FIG. 2 is a view showing the relationship between the recording surface of an optical card, and the scanning velocity of a light spot which is scanned on the optical card.
Figure 3:
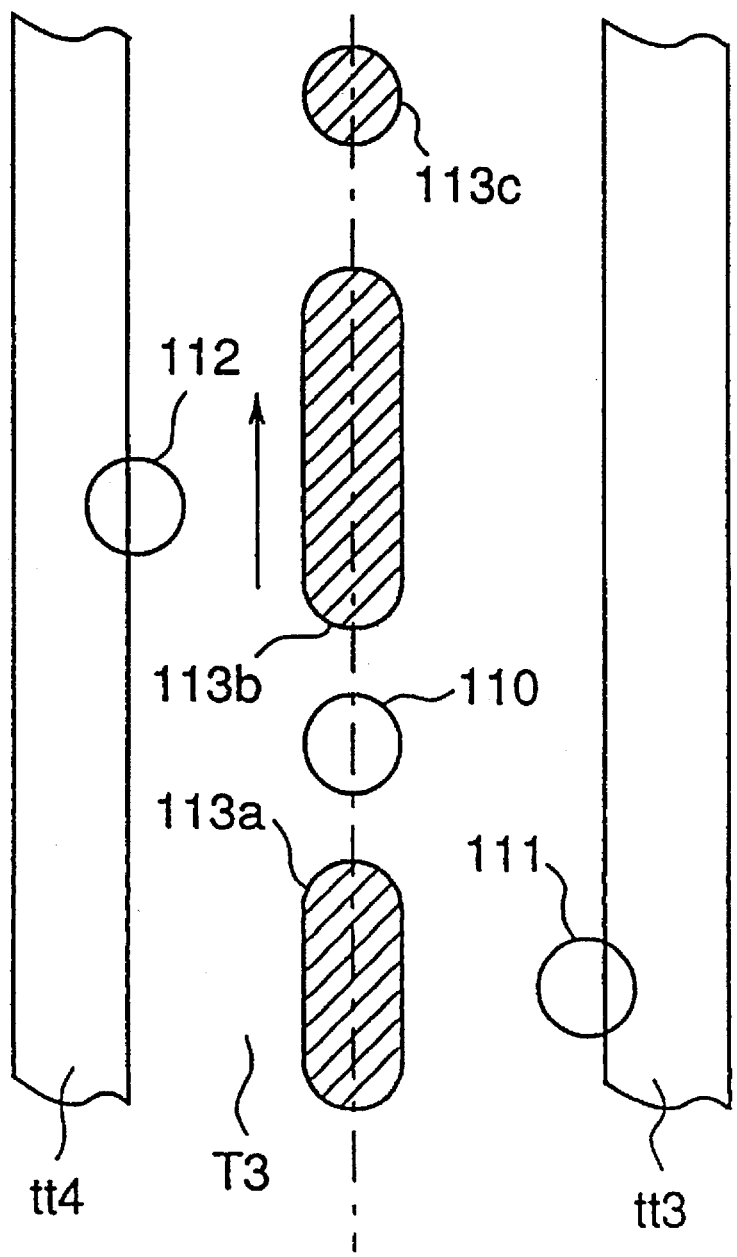
FIG. 3 is a plan view showing pits recorded on the optical card, and a light spot which is scanned on the pits.
Figure 4:
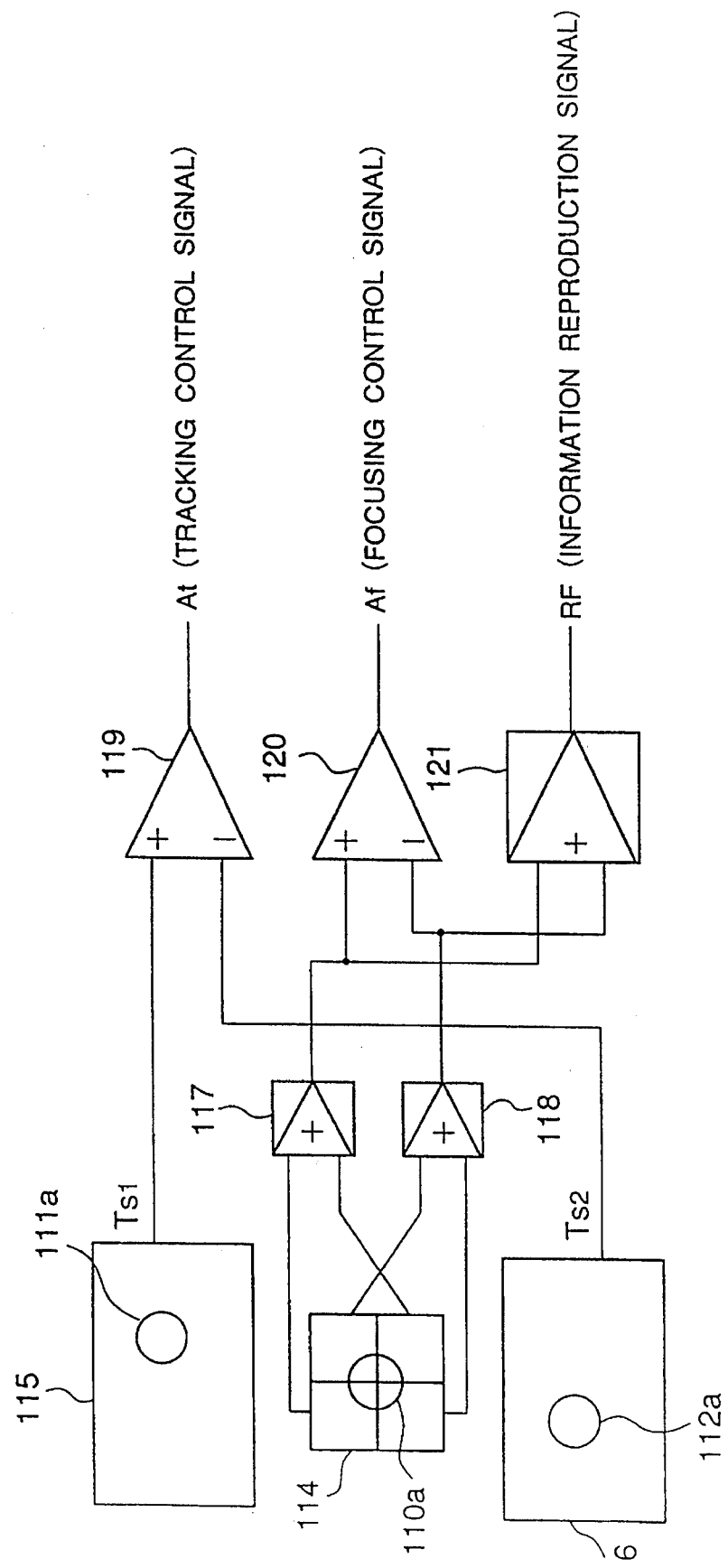
FIG. 4 is a circuit diagram showing in detail a photodetector shown in FIG. 1 and a signal processing circuit.
Figure 5A:
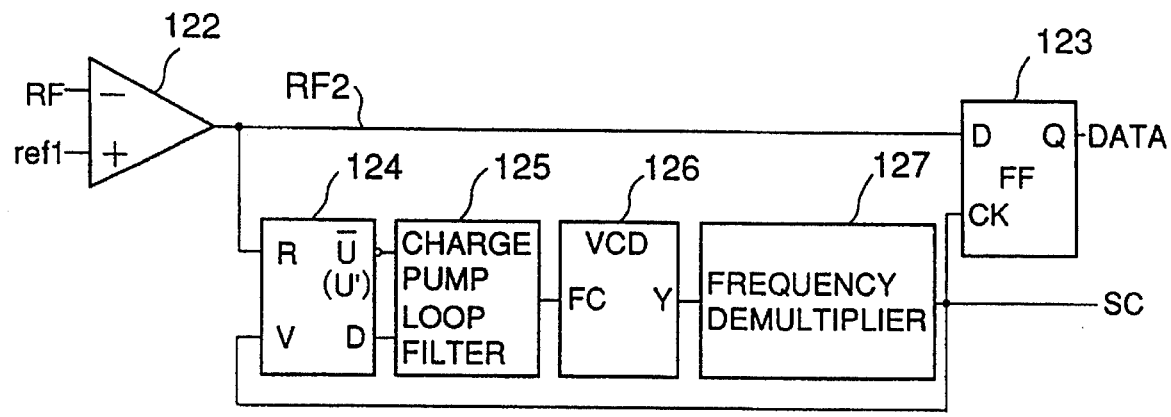
FIGS. 5(a) through 5(c) are circuit diagrams showing a conventional binary reproduction signal processing circuit based on a PLL control circuit, and the detailed circuits of a phase comparator and a charge pump/loop filter used in the processing circuit.
Figure 5B:
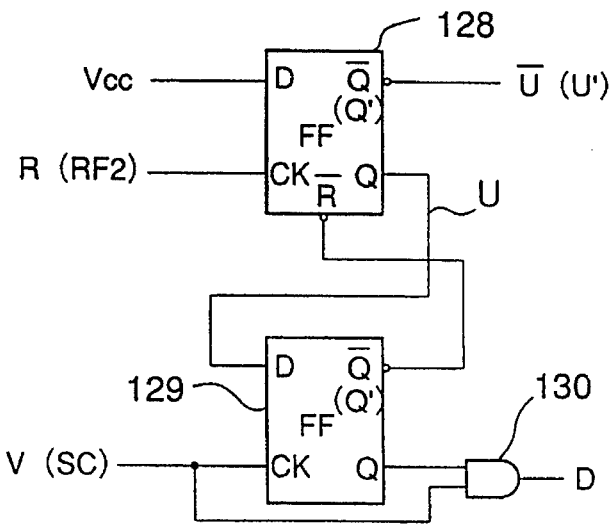
Figure 5C:
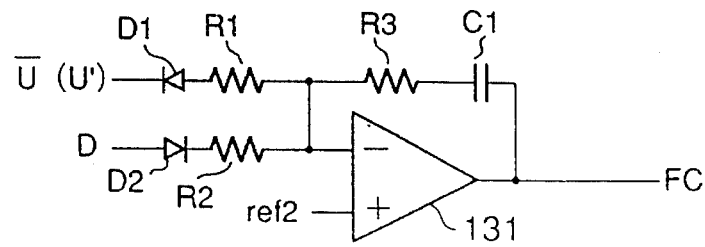

A circuit shown in FIG. 5(b) is used as the phase comparator 4, and a circuit shown in FIG. 5(c) is used as the charge pump/loop filter 5. The VCO 6 oscillates at a frequency twice that in FIG. 5, i.e., a frequency four times that of the sampling clock SC, and the frequency demultiplier 7 outputs a signal having a frequency twice that of the sampling clock SC to have a duty ratio of 1:1. The output from the frequency demultiplier 7 is input to the clock terminal of a D-type flip-flop 10 for generating the sampling clock SC, and is also fed back to a V terminal of the phase comparator 4 after it is inverted by an inverter 9. A general end portion detection circuit is constituted by a delay circuit 2 for delaying the binary reproduction signal RF2 by a predetermined period of time, and an exclusive OR gate (ExOR) 8. More specifically, when the binary reproduction signal RF2 and a signal obtained by delaying the signal RF2 by the delay circuit 2 are exclusively ORed by the ExOR 8, a pulse signal corresponding to the leading and trailing edges of each change point of the binary reproduction signal RF2 can be obtained, and this pulse signal is input to the other input terminal R of the phase comparator 4.

Figure 6:
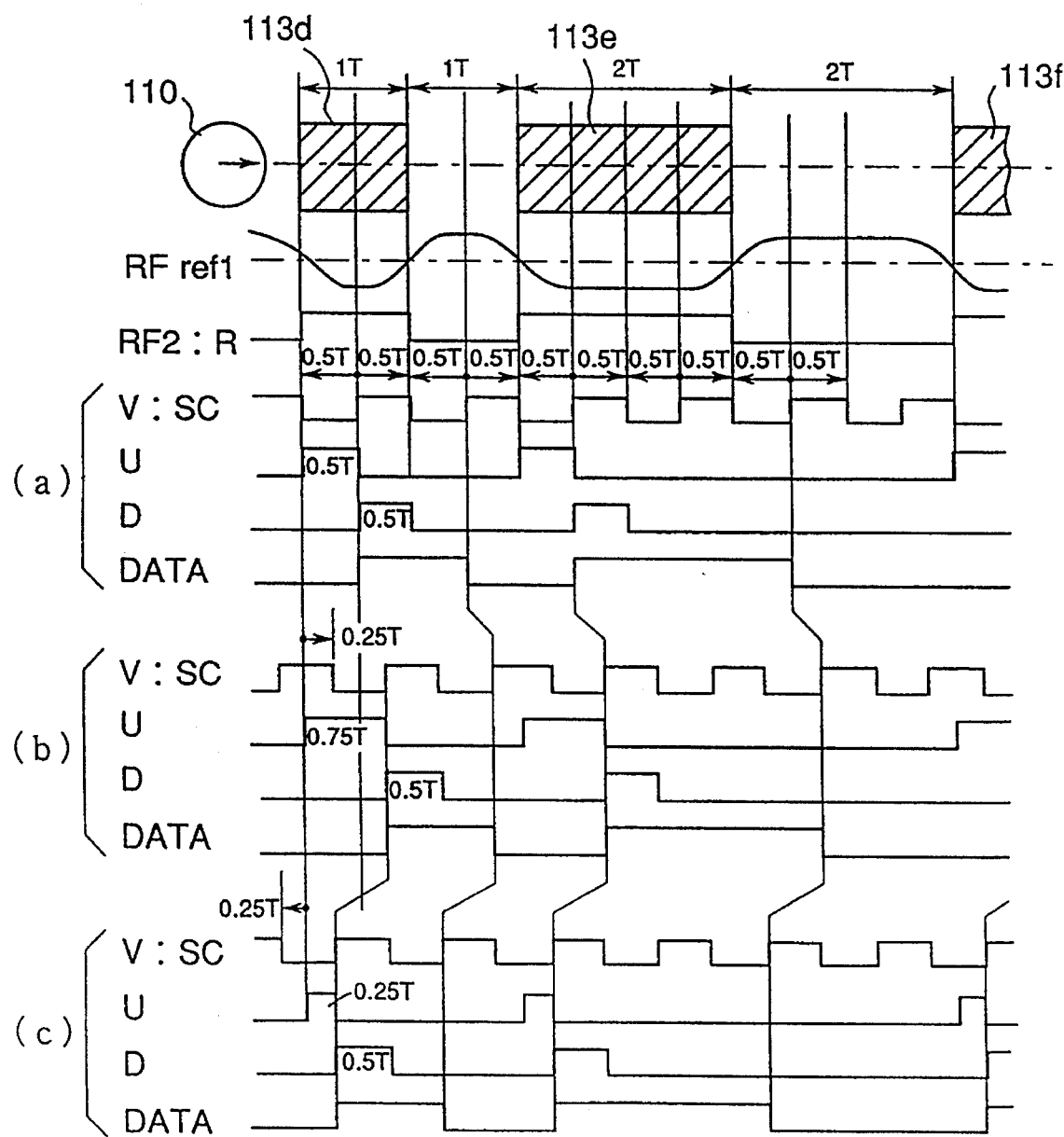
FIG. 6 is a timing chart showing the signals of the respective units of the PLL control circuit shown in FIG. 5(a)
Figure 7:
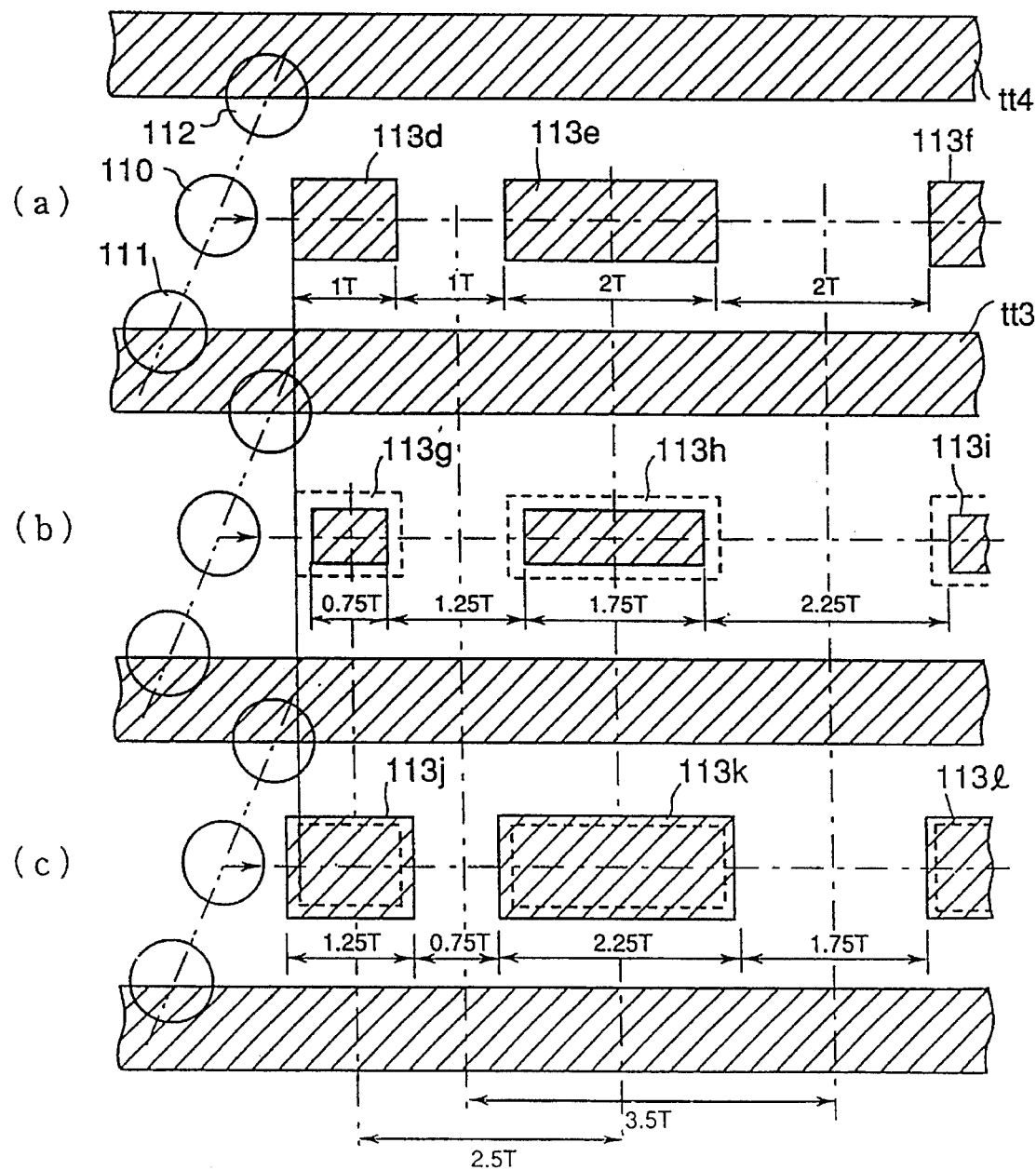
FIG. 7 is a view showing states wherein pits whose sizes have changed are scanned by a light spot.

The pulse width of the output from the ExOR 8 can be arbitrarily set by the delay time of the delay circuit 2. The delay circuit 2 may adopt a delay element, or may be digitally constituted by a flip-flop and a counter using another high-frequency clock. The phase comparator 4 adopts the same arrangement as that shown in FIG. 5(b). Therefore, as can be understood from the above description, the outputs U and D from the phase comparator 4 are generated at both the leading and trailing edges of the binary reproduction signal RF2 to have a pulse width ½ that of the outputs U and D shown in FIG. 6.

The information recording formats of an optical information recording medium include mark length recording for recording information based on the length of an optical mark (pit) itself and pit edge recording for recording information based on the interval between two adjacent marks. This embodiment can be applied to both the recording methods. Optical marks include a mark recorded as a recess or projection on a reference surface and a mark recorded with an optical density difference. Furthermore, optical marks include a mark pre-formatted in the manufacture of a recording medium, and a mark optically recorded after the manufacture of a recording medium.

Figure 11:
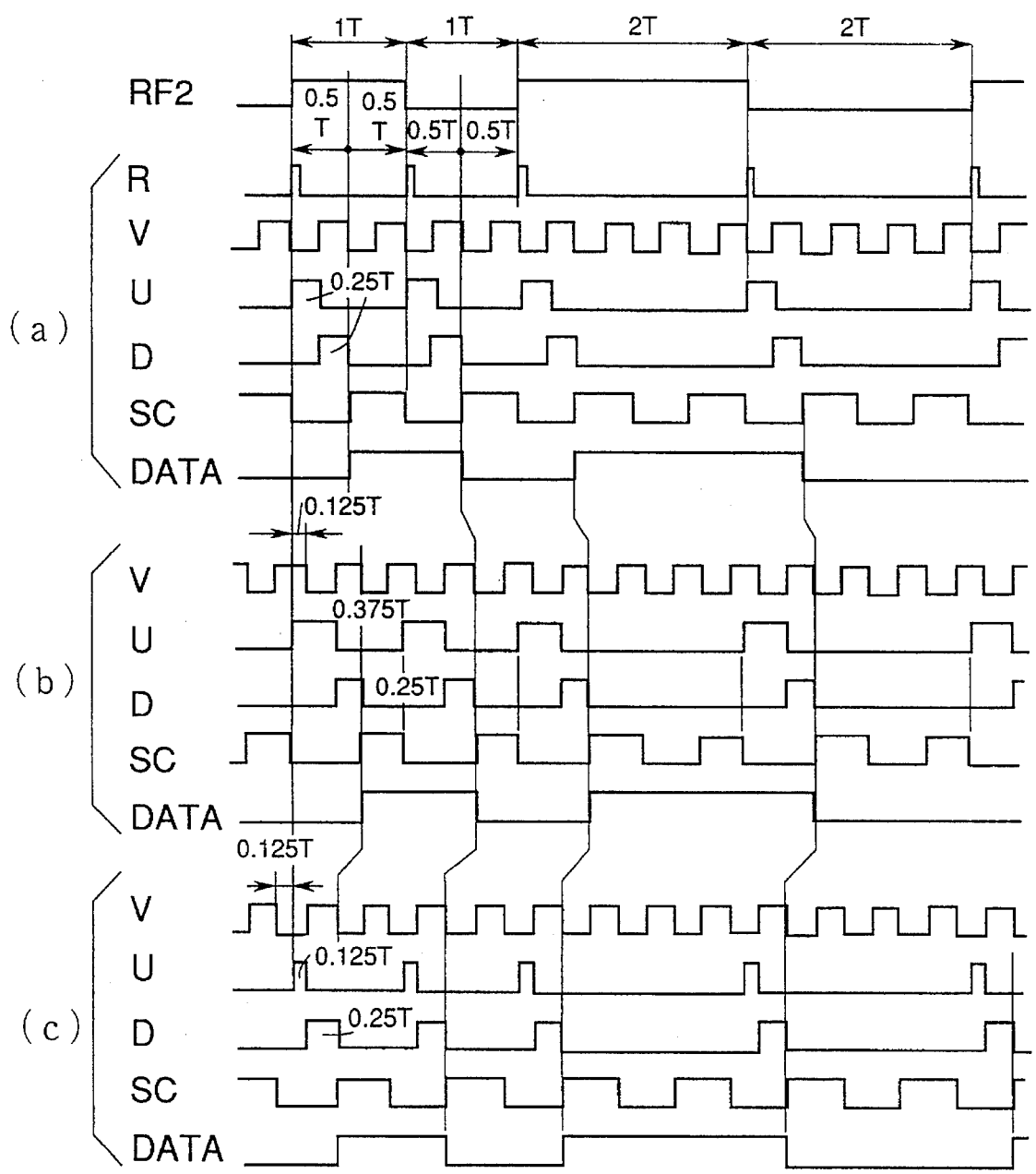
FIG. 11 is a timing chart showing signals from the respective units in the embodiment shown in FIG. 10 in a case wherein a signal R corresponding to a change point of a binary reproduction signal is synchronized with a double-frequency signal V of a sampling clock SC, in a case wherein the double-frequency signal V is delayed from the binary reproduction signal, and in a case wherein the double-frequency signal V advances from the binary reproduction signal.

The operation of the first embodiment will be described below with reference to FIG. 11. Referring to FIG. 11, RF2 represents the binary reproduction signal binarized by the comparator 1, and R represents the pulse signal which corresponds to the leading and trailing edges of the binary reproduction signal RF2, as described above, and is input from the ExOR 8 to the phase comparator 4. Part (a) of FIG. 11 shows the signals from the respective units when the signal R corresponding to each change point of the binary reproduction signal RF2 is synchronized with the double-frequency signal V of the sampling clock SC. In part (a) of FIG. 11, the pulse widths of both the outputs U and D of the phase comparator 4 are 0.25T, and the PLL control signal generator is in a stable operation state. In this case, the output U from the phase comparator 4 is output to the reset terminal of the flip-flop 10, and the flip-flop 10 is reset by the output signal U. Thus, the leading edge of the sampling clock SC is set at the center of a 1T pit, i.e., a maximum margin of 0.5T for a variation in scanning velocity is set. As described above, the output U from the phase comparator 4 not only represents a phase delay, but also corresponds to each change point of the binary reproduction signal RF2. Thus, when the flip-flop 10 is reset by the signal U, as described above, the trailing edge of the next double-frequency clock V of each change point of the binary reproduction signal is synchronized with the leading edge of the sampling clock SC.

Part (b) of FIG. 11 shows signals from the respective units when the double-frequency clock V of the sampling clock SC is delayed by 0.125 (12.5%) from the binary reproduction signal RF2. At this time, the pulse width of the output U from the phase comparator 4 becomes larger by 0.125T than the pulse width of the other output D. Part (c) of FIG. 11 shows signals from the respective units when the double-frequency clock V advances by 0.125T (12.5%) from the binary reproduction signal RF2. In this case, the pulse width of the output U from the phase comparator 4 becomes smaller by 0.125T than the pulse width of the output D. In this manner, the PLL control signal Generator including the phase comparator 4 operates to synchronize the binary reproduction signal RF2 and the double-frequency clock V, i.e., the sampling clock SC with each other on the basis of the difference between the pulse widths of the outputs U and D from the phase comparator 4. As shown in parts (b) and (c) of FIG. 11, the flip-flop 10 outputs signal data (DATA) synchronized with the sampling clock SC.

Note that the flip-flop 10 may be reset by the signal R as a signal corresponding to a change point of the binary reproduction signal RF2. However, in the case of part (b) of FIG. 11, when the pulse width of the signal R is small, the sampling clock SC is set at the trailing edge of the signal V which must rise. Therefore, when the signal R is used for resetting the flip-flop 10, the pulse width of the signal R must be set to be 0.25T or more. In contrast to this, when the signal U is used for resetting the flip-flop 10, the signal U continues up to the leading edge of the signal V, and the sampling clock SC is not inverted by the immediately preceding signal V. For this reason, it is more reliable to reset the flip-flop 10 by the signal U.

Figure 8:
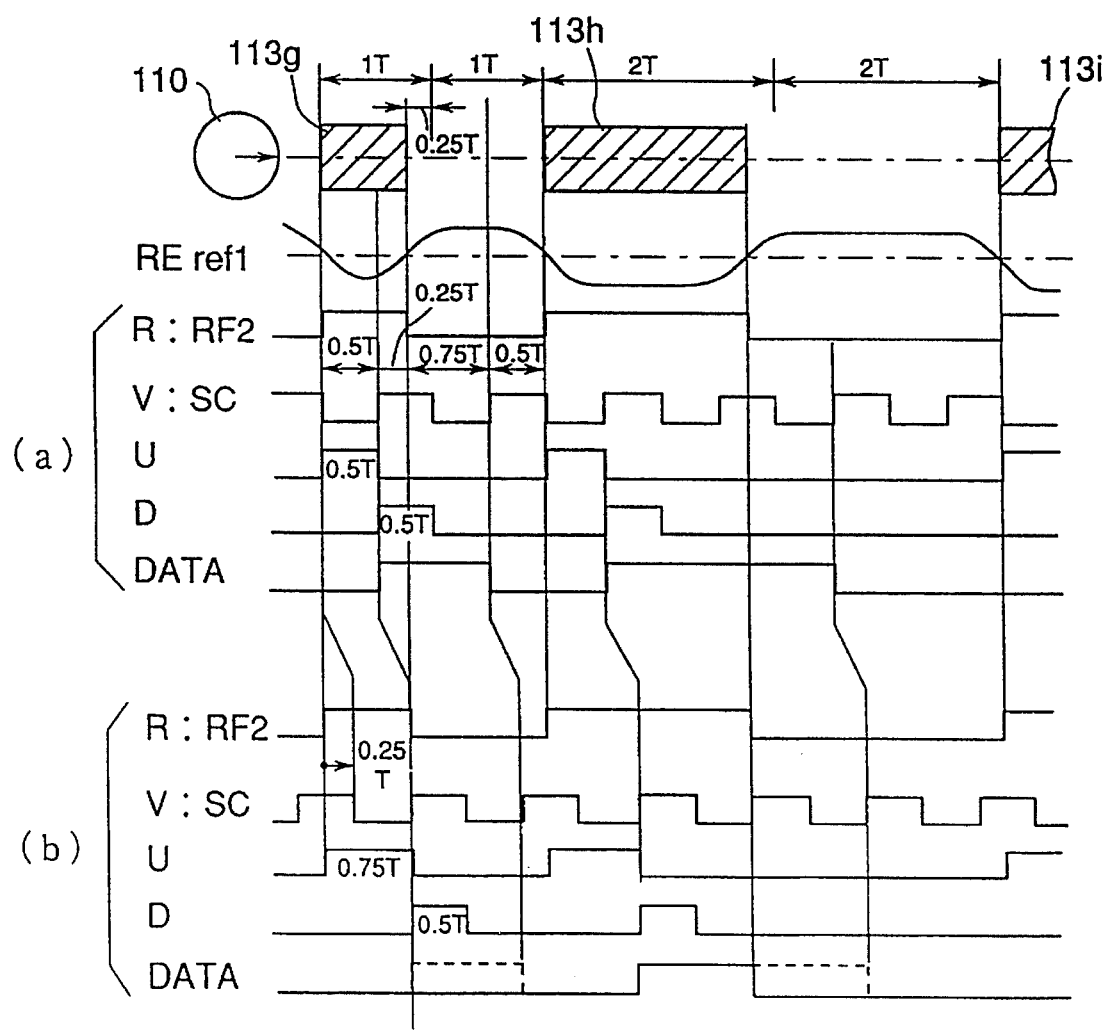
FIG. 8 is a timing chart showing the signal from the respective units in the PLL control circuit shown in FIG. 5(a) when the pit size decreases.
Figure 9:
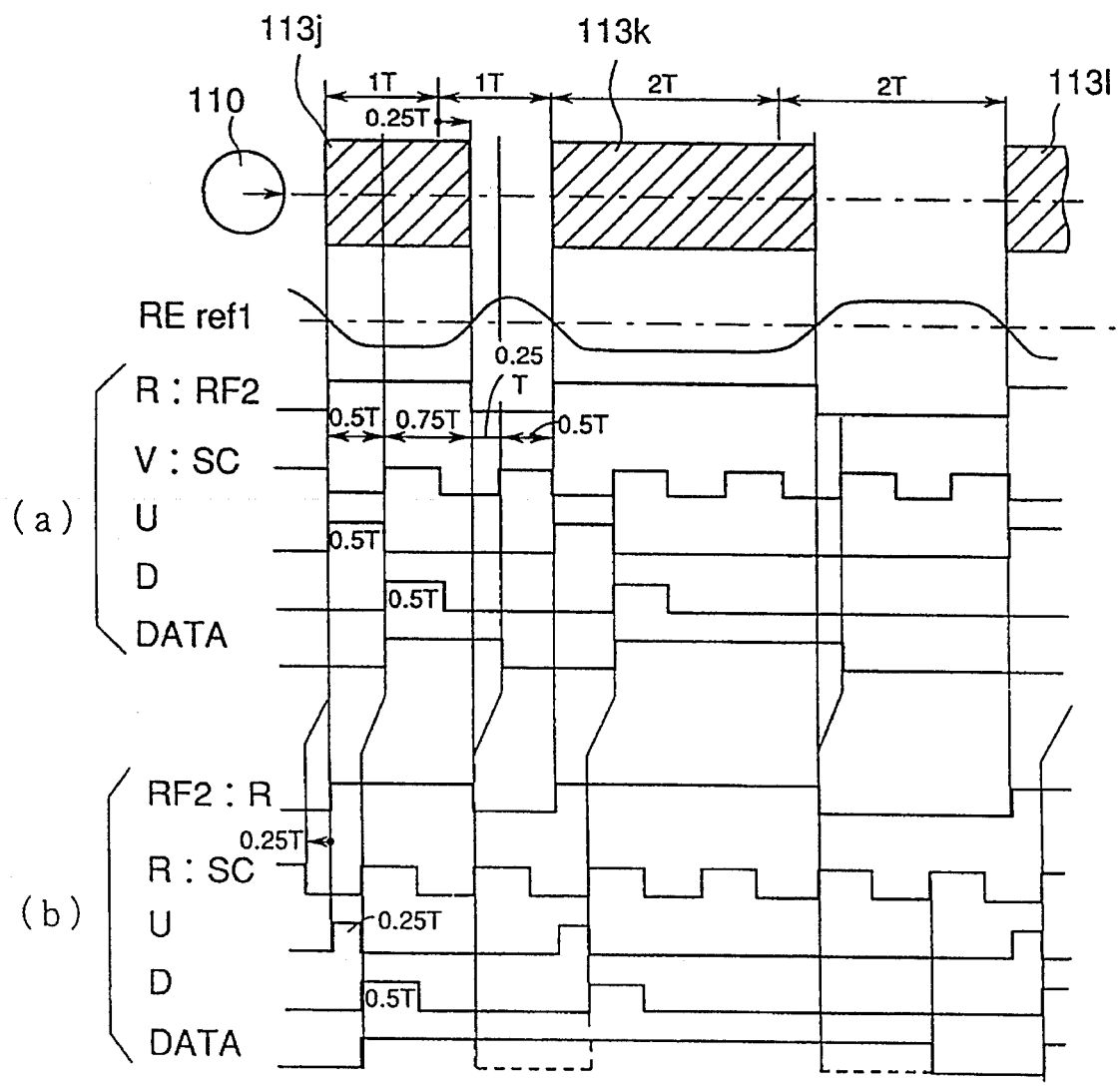
FIG. 9 is a timing chart showing the signals from the respective units in the PLL control circuit shown in FIG. 5(a) when the pit size increases.
Figure 12A:
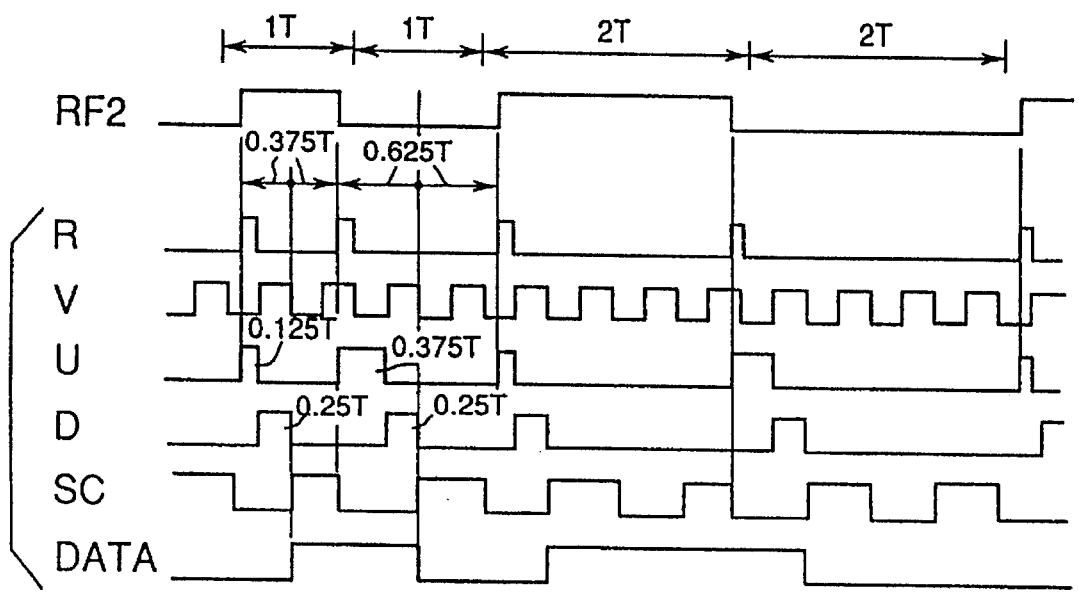
FIGS. 12(a) and 12(b) are timing charts showing signals from the respective units in the embodiment shown in FIG. 10 in a case wherein the pit size decreases by 0.25T and in a case wherein the pit size increases by 0.25T.
Figure 12B:
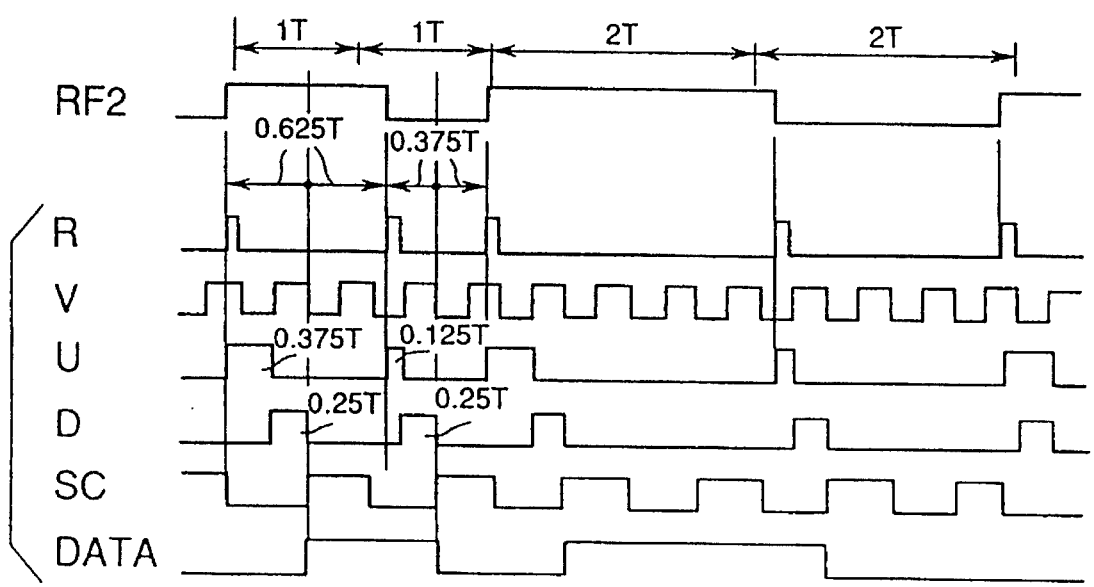

FIGS. 12(a) and 12(b) are views showing cases wherein the present invention is applied to part (a) of FIG. 8, and part (a) of FIG. 9, i.e., views showing signals from the respective units in a case wherein the pit size decreases by 0.25T and in a case wherein the pit size increases by 0.25T. As is apparent from FIGS. 12(a) and 12(b), when the pit size decreases or increases, the pulse width of the signal U varies in correspondence with the leading- or trailing-edge portion of the binary reproduction signal RF2. However, in this case, the double-frequency clock V, i.e., the sampling clock SC is synchronized with a phase at which the pulse width as a combination of both the leading- and trailing-edge portions or an average pulse width becomes equal to that of the signal D. This is because the PLL control signal generator does not have so highly improved response characteristics as to respond to each pulse of the signals U and D, but operates based on an average value within a certain range. The response characteristics are determined by the resistance and the capacitance of the charge pump/loop filter shown in (c) of FIG. 5(c).

As is understood from FIGS. 12(a) and 12(b) of FIG. 12, the leading edge of the sampling clock SC is located at the center of a 1T pit or the center of a 1T interval. In other words, when the flip-flop 10 is reset by the signal U, as described above, the leading edge of the sampling clock SC is positioned at the center of a 1T pit or the center of a 1T interval. Therefore, even when the pit size changes by 0.25T, as shown in FIG. 12(a) and FIG. 12(b), the margin for a variation in scanning velocity decreases by only 0.125T which is half of the change in pit size. Therefore, the decrease in margin can be suppressed to be smaller than the change in pit size. In this manner, according to this embodiment, when the sampling clock SC is synchronized with each change point of the binary reproduction signal, i.e., the central position of each change point of a pit, the decrease in margin for a variation in scanning velocity can be suppressed to ½ of the change in pit size. As a result, reproduction of wrong data due to a decrease in margin can be avoided unlike in the conventional apparatus.

The second embodiment of the present invention will be described below. Since the first embodiment described above detects phases at positions numbering twice those in the conventional apparatus, the detection gain of the phase comparator can be doubled. However, since the frequency of the V input of the phase comparator is doubled, the lock range of the PLL control signal generator is halved, i.e., ±0.25T as compared to ±0.5T of the conventional apparatus. Thus, the second embodiment prevents such a decrease in PLL lock range. FIGS. 12(a) and 12(b) are block diagrams showing the second embodiment. The apparatus shown in those figures includes a binarization comparator 1, a delay circuit 2, and a D-type flip-flop 3, which are the same as those in the first embodiment. The apparatus also includes a charge pump/loop filter 5, and a VCO 6. In this embodiment, the VCO 6 oscillates at the same frequency as that in FIGS. 5(a) through 5(c), i.e., at a frequency ½ that in the first embodiment. The apparatus further includes a frequency demultiplier 7 and an ExOR 8, which are the same as those in the first embodiment. As will be described later, since this embodiment does not utilize the pulse width of the sampling clock SC, and the duty ratio of the sampling clock SC need not be adjusted to 1:1, the frequency demultiplier 7 may be omitted. When the frequency demultiplier 7 is omitted, the oscillation frequency of the VCO 6 becomes ½ that in FIGS. 5(*a*) through 5(*c*), i.e., ¼ that of the first embodiment, as a matter of course. The apparatus also includes a phase comparator 11.

Figure 13A:
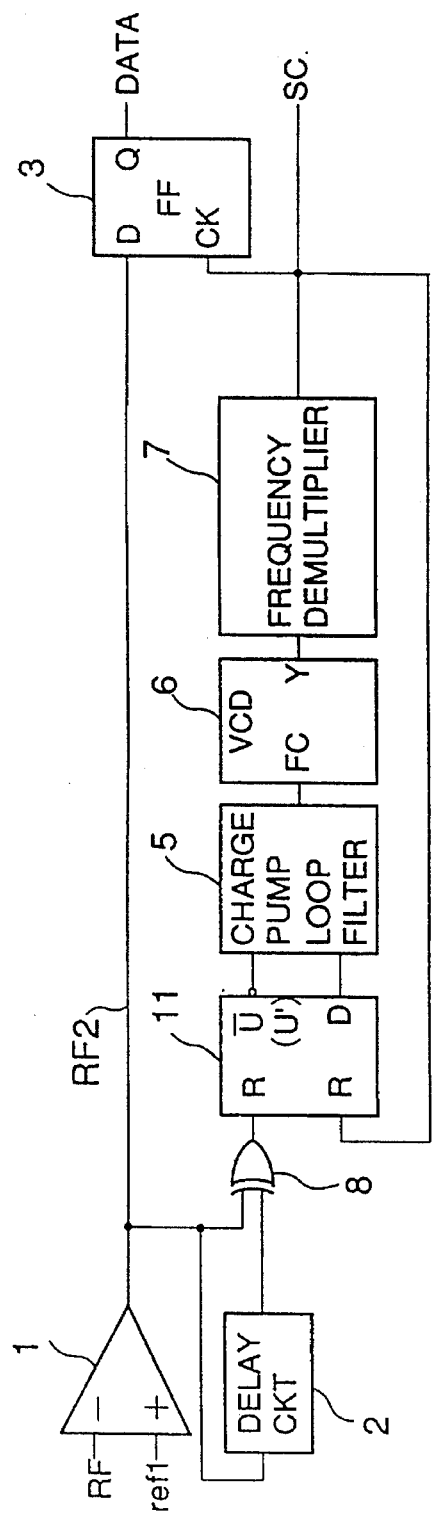
FIGS. 13(a) and 13(b) are circuit diagrams showing the second embodiment of the present invention, and a phase comparator used in the second embodiment.
Figure 13B:
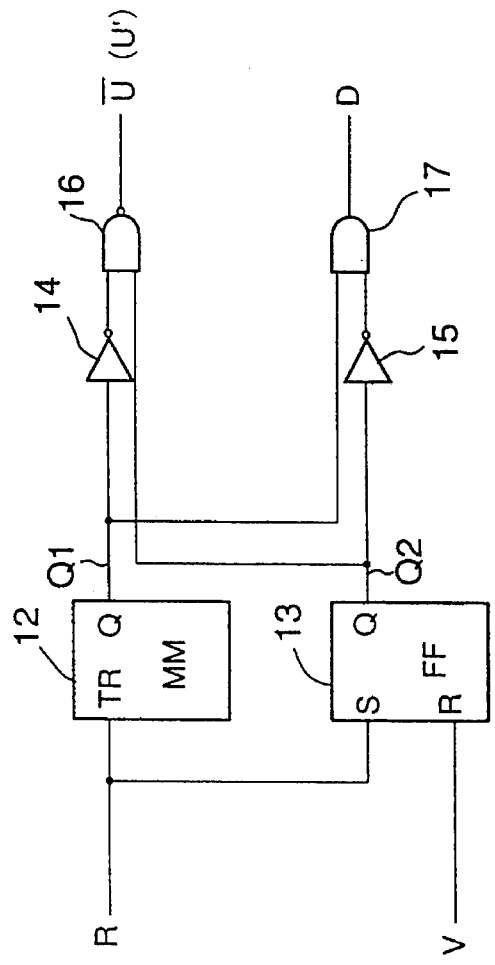

FIG. 13(*b*) shows the detailed circuit arrangement of the phase comparator 11. The phase comparator 11 includes a monostable multivibrator 12, a flip-flop 13, inverters 14 and 15, a NAND gate 16, and an AND gate 17. A signal R corresponding to each change point of a binary reproduction signal RF2 is output to the monostable multivibrator 12 as a trigger signal, and is also output to the flip-flop 13 as a set signal. The pulse width of the monostable multivibrator 12 is set to be half (0.5T) of a time required for scanning a minimum pit by a light spot. The reset terminal of the flip-flop 13 receives the sampling clock SC. Therefore, an output Q2 from the flip-flop 13 is a signal representing the phase difference (time difference) between the signal R and the sampling clock SC.

Figure 14:
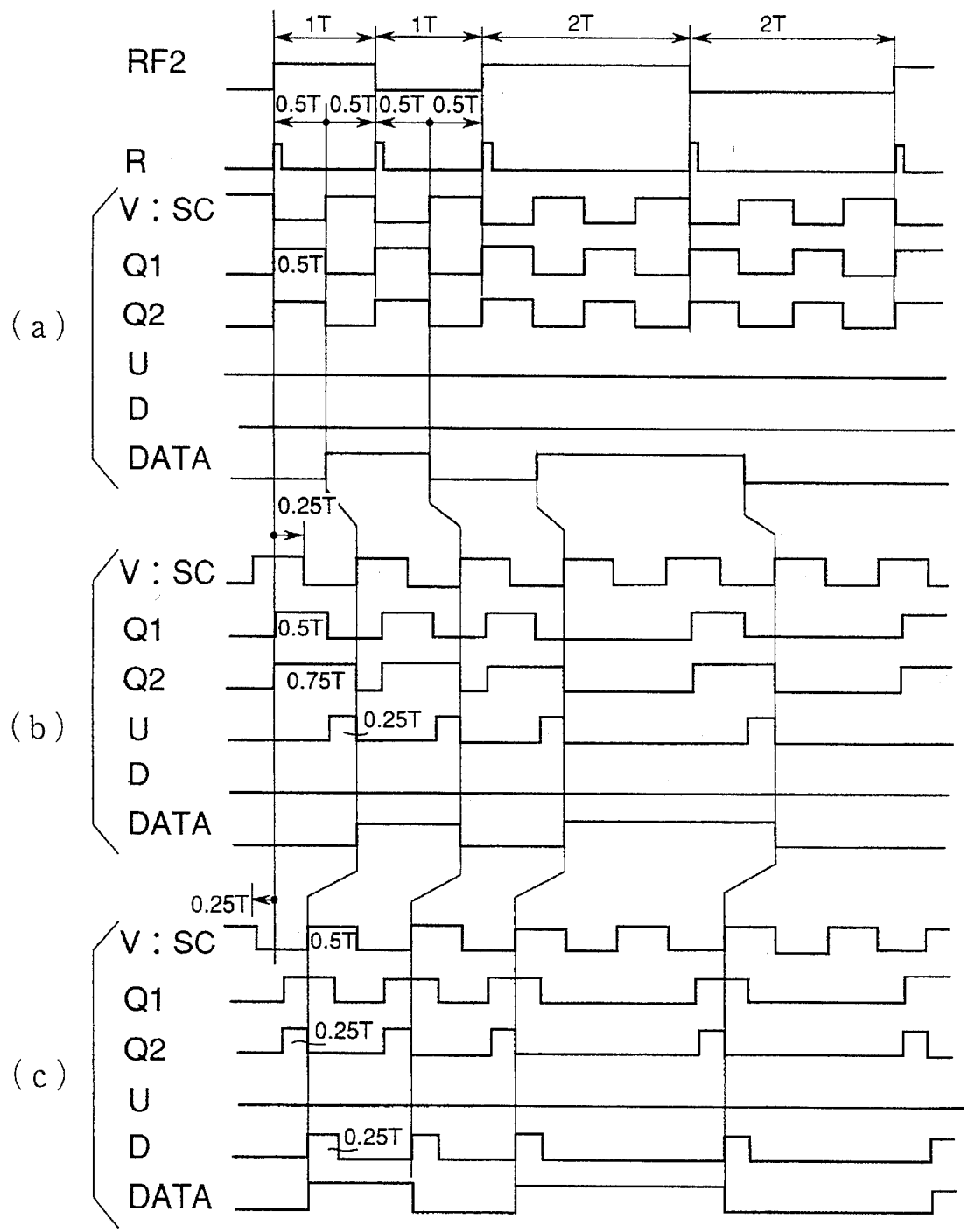
FIG. 14 is a timing chart showing signals from the respective units in the embodiment shown in FIGS. 13(a) and (b) in a case wherein a signal R corresponding to a change point of a binary reproduction signal is synchronized with a double-frequency signal V of a sampling clock SC, in a case wherein the double-frequency signal V is delayed from the binary reproduction signal, and in a case wherein the double-frequency signal V advances from the binary reproduction signal.

The operation of the second embodiment will be described below with reference to FIG. 14. Parts (a), (b), and (c) of FIG. 14 respectively correspond to parts (a), (b), and (c) of FIG. 11 of the first embodiment. More specifically, part (a) of FIG. 14 shows signals from the respective units when the signal R corresponding to each change point of the binary reproduction signal RF2 is synchronized with the sampling clock SC (signal V), part (b) of FIG. 14 shows signals from the respective units when the sampling clock SC is delayed by 0.25T from the binary reproduction signal RF2, and part (c) of FIG. 14 shows signals from the respective units when the sampling clock SC advances by 0.25T from the binary reproduction signal RF2. In parts (b) and (c) of FIG. 11, the phase delay and advance are 0.125T. However, in this embodiment, the phase delay and advance are 0.25T. In this embodiment, as is apparent from FIG. 14, the pulse width of the output Q2 from the flip-flop 13 changes in correspondence with the phase difference between the binary reproduction signal RF2 and the sampling clock SC in the same manner as the signal U shown in FIG. 6. Therefore, the operation of this embodiment is the same as that in FIGS. 5(*a*) through 5(*c*) while the output Q2 from the flip-flop 13 and the output Q1 from the monostable multivibrator 12 replace the signals U and D in the conventional apparatus in FIGS. 5(*a*) through 5(*c*). However, in the second embodiment, since the timings of the outputs Q1 and Q2 shown in FIG. 14 are synchronized with each other, pure signals U and V can be generated.

A signal U' as an output from the phase comparator 11 is a signal obtained by logically NANDing the signal Q2 and a signal obtained by inverting the signal Q1 by the inverter 14 by the NAND gate 16. In FIG. 14, however, a non-inverted signal U is illustrated in place of U' for the sake of easy understanding. A signal D as the other output from the phase comparator 11 is a signal obtained by logically ANDing the signal Q1 and a signal obtained by inverting the signal Q2 by the inverter 15 by the AND gate 17. In part (a) of FIG. 14, since the output Q1 from the monostable multivibrator 12 becomes 0.5T, and the output Q2 from the flip-flop 13 also becomes 0.5T, the phase difference between the two outputs is zero, and the phase comparator 11 outputs neither of the outputs U and V. In contrast to this, when the sampling clock SC is delayed from the binary reproduction signal RF2, as shown in part (b) of FIG. 14, the phase comparator 11 outputs only the signal U having a pulse width corresponding to the phase difference between the two outputs; when the sampling clock SC advances from the binary reproduction signal RF2, as shown in part (c) of FIG. 14, the phase comparator 11 outputs only the signal D having a pulse width corresponding to the phase difference between the two outputs.

Figure 15A:
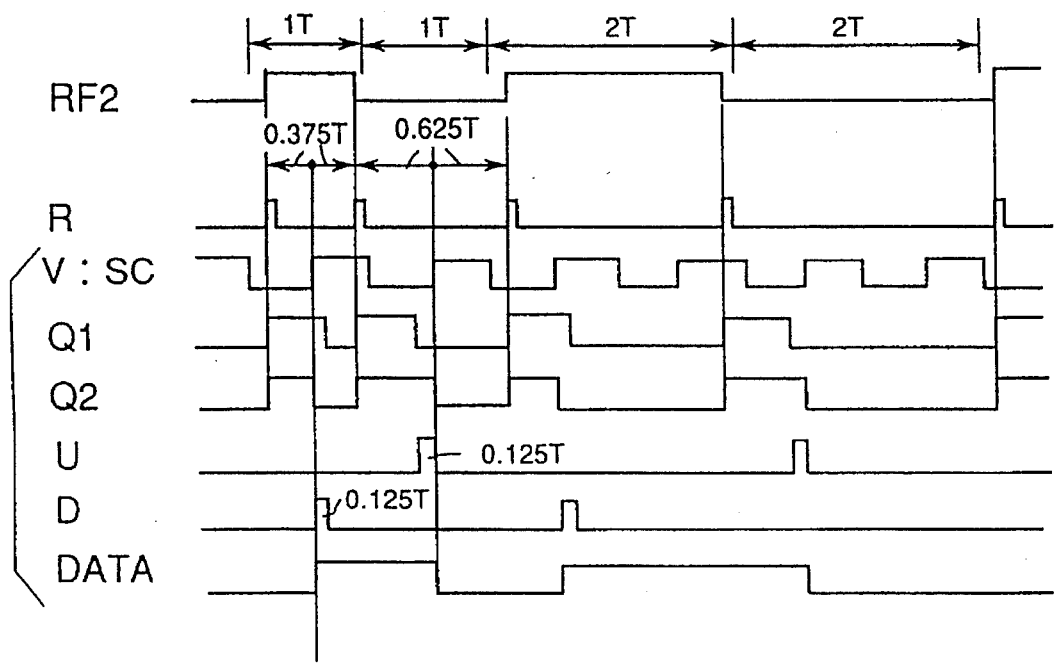
FIGS. 15(a) and 15(b) are timing charts showing signals from the respective units in the embodiment shown in FIGS. 13(a) and 13(b) in a case wherein the pit size decreases by 0.25T and in a case wherein the pit size increases by 0.25T.
Figure 15B:
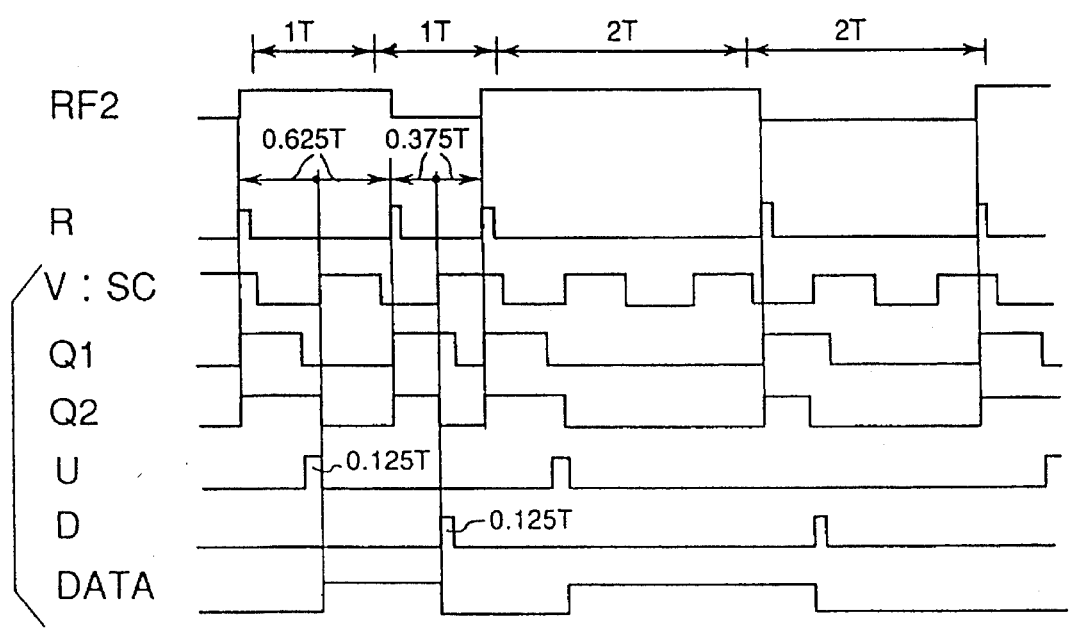

FIG. 15(*a*) and FIG. 15(*b*) are views showing signals from the respective units in a case wherein the pit size decreases by 0.25T and in a case wherein the pit size increases by 0.25T, as in parts (a) and (b) of FIG. 11 of the first embodiment. As is apparent from FIGS. 15(*a*) and 15(*b*), the leading edge of the sampling clock SC is located at the center of a 1T pit or the center of a 1T interval as in the first embodiment, and the margin for a variation in scanning velocity decreases by only 0.125T which is half of the change in pit size, while the pit size changes by 0.25T. In this embodiment, since the input to the phase comparator 11 has the same frequency as that of the sampling clock SC, the PLL lock range corresponds to ±0.5T, and can be twice as large as that in the first embodiment.

In the embodiment shown in FIGS. 13(*a*) and 13(*b*), synchronization precision between the binary reproduction signal and the sampling clock depends on precision of the monostable multivibrator 12, as can be seen from the timing chart of FIG. 14. On the other hand, since a recording medium expands/shrinks due to a change in environmental condition such as variations in temperature, humidity, and the like, the time required for scanning a pit by a light spot also changes. That is, the time of 1T may change. In this case, if the output Q1 from the monostable multivibrator 12 is fixed, synchronization precision is impaired upon occurrence of variations of the recording medium. As a countermeasure against this problem, the following method is available. That is, by utilizing the fact that the frequency of the sampling clock SC follows a change in binary reproduction signal RF2 under the PLL control, the oscillation frequency of the VCO 6 may be set to be a predetermined integer multiple of the frequency of the sampling clock SC, and the frequency demultiplication ratio of the frequency demultiplier 7 may be set to be 1/(predetermined integer). Then, when the monostable multivibrator 12 comprises a counter which uses the high frequency multiplied with the predetermined integer as a clock, and counts the clock for 0.5T, the pulse width of the signal Q1 changes to follow variations of the recording medium and a variation in scanning velocity. Thus, constant synchronization precision can be maintained. For example, the VCO 6 may oscillate at a frequency 128 times that of the sampling clock SC, the monostable multivibrator 12 may output the pulse signal Q1 for a count of 64 in synchronism with the signal R, and the frequency demultiplier 7 may demultiply its input with 128 to output the sampling clock SC.

Figure 16:
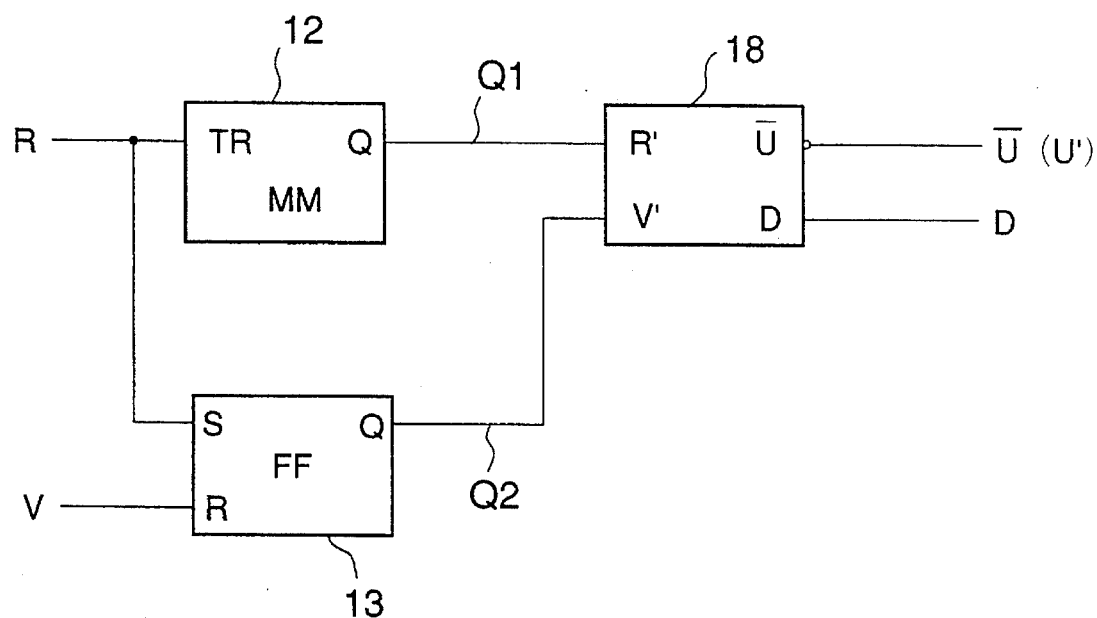
FIG. 16 is a circuit diagram showing another phase comparator used in the embodiment shown in FIGS. 13(a) and 13(b)
Figure 17:
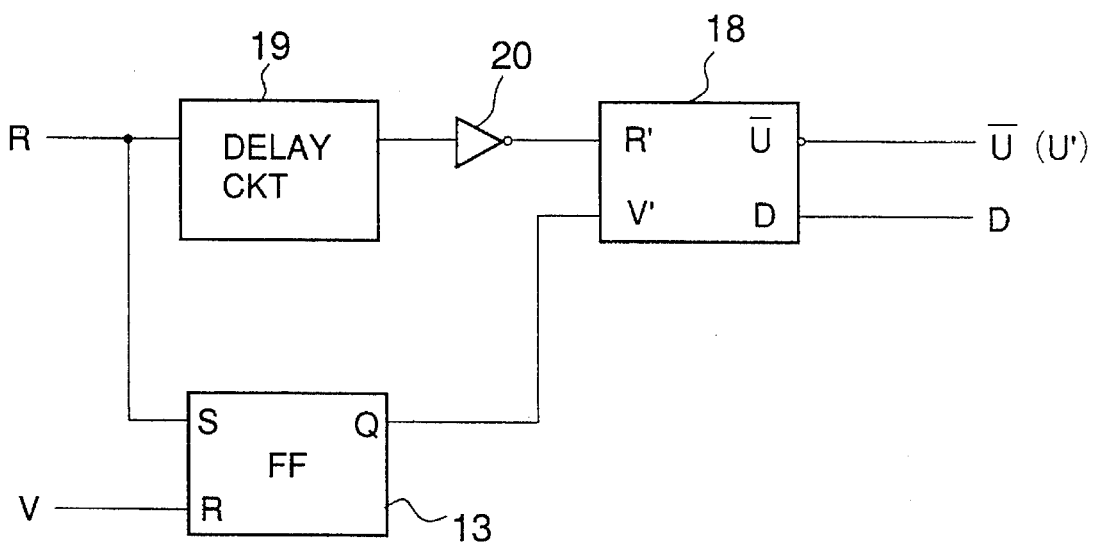
FIG. 17 is a circuit diagram showing still another phase comparator used in the embodiment shown in FIGS. 13 (a) and 13(b).

FIG. 16 is a block diagram showing another arrangement of the phase comparator shown in FIG. 13(*b*). In this embodiment, a single phase comparator 18 is used in place of the digital circuit constituted by the inverters 14 and 15, the NAND gate 16, and the AND gate 17. As the phase comparator 18, MC4044 (trade name) is commercially available from Motorola Co., and this IC detects a phase difference between the trailing edges of R and V inputs to output U' and D signals. The operation of this embodiment is the same as those in FIGS. 14 and 15(*a*) and (*b*). In the embodiment shown in FIG. 16, before synchronization of the PLL, i.e., when the frequency of the sampling clock SC is largely different from that of the binary reproduction signal RF2, almost perfect U' and V signals can be output. Furthermore, when the phase comparator 18 is used, since the pulse width of the signal Q1 need not be considered, the monostable multivibrator 12 may be replaced by a delay circuit 19 for delaying its input by the pulse width of the signal Q1, and an inverter 20, as shown in FIG. 17.

As described above, according to the present invention, since synchronization is achieved based on the leading and trailing edges of the binary reproduction signal, even when the pit size changes due to a change in environmental characteristics of a recording medium, a manufacturing error, or a variation in intensity of a recording light spot, a decrease in margin caused by a variation in scanning velocity of the light spot for scanning the pit can be suppressed to be smaller than a change in pit size. Even when the pit size changes, if the central position of a pit or the center interval of two adjacent pits remains the same, a decrease in margin can be suppressed to be ½ of the change in pit size. Furthermore, since the decrease in margin caused by a variation in scanning velocity can be suppressed by adding a small number of hardware components, the problem concerning reproduction of wrong data caused by the decrease in margin can be prevented, and digital information can be stably reproduced with high reliability.

What is claimed is:

1. An optical information reproduction apparatus comprising:

means for reading out digital information recorded as an optical mark on an optical information recording medium as an information reproduction signal by scanning the recording medium with a light beam;

conversion means for converting the information reproduction signal into a binarized reproduction signal;

means for generating a first signal corresponding to leading and trailing edges of a change point of the binarized reproduction signal;

means for generating a sampling clock signal;

means for generating a second signal which oscillates at a frequency at least twice a frequency of the sampling clock signal;

phase comparison means for generating a phase advance signal and a phase delay signal, the phase advance signal being a signal which indicates a phase difference between the first signal and the second signal, the phase delay signal having a pulse width equal to the second signal; and means for reproducing the digital information by sampling the binarized reproduction signal with the sampling clock signal on the basis of the phase advance signal and the phase delay signal.

2. An apparatus according to claim 1, wherein the optical mark has a recessed or projecting pattern with respect to a reference surface.

3. An apparatus according to claim 1, wherein the optical mark has an optical density difference from a region other than the mark.

4. An apparatus according to claim 1, wherein the optical mark is a mark pre-formatted in manufacture of the optical information recording medium.

5. An apparatus according to claim 1, wherein the optical mark is a mark of digital information optically recorded after manufacture of the optical information recording medium.

6. An apparatus according to claim 1, wherein said means for generating the second signal comprises a frequency demultiplier for demultiplying the frequency of the second signal having the frequency at least twice the frequency of the sampling clock signal to ½.

7. An apparatus according to claim 6, wherein said frequency demultiplier is reset by the first signal corresponding to the leading and trailing edges of the change point of the binarized reproduction signal so as to control phases of the sampling clock signal and the binarized reproduction signal.

8. An optical information reproducing apparatus comprising:

means for reading out digital information recorded as an optical mark on an optical information recording medium as an information reproduction signal by scanning the recording medium with a light beam;

conversion means for converting the information reproduction signal into a binarized reproduction signal;

means for generating a first signal corresponding to leading and trailing edges of a change point of the binarized reproduction signal;

means for generating a sampling clock signal;

phase comparison means for generating a first output indicative of a phase difference between the first signal and the sampling clock signal and for comparing the first output with a second output which is a predetermined pulse; and means for reproducing the digital information by sampling the binarized reproduction signal with the sampling clock signal on the basis of a signal from said phase comparison means.

9. An apparatus according to claim 8, wherein the predetermined pulse is a pulse which is synchronized with the binarized reproduction signal, and has a pulse width substantially corresponding to ½ of a time required for optically scanning a minimum length of the optical mark.

10. An apparatus according to claim 8, further comprising a voltage-controlled oscillator for outputting a high-frequency signal corresponding to an integer multiple of the sampling clock signal, and the predetermined pulse is generated as a pulse having a pulse width substantially corresponding to ½ of a period of the sampling clock signal by counting the high-frequency signal in synchronism with the binarized reproduction signal.

11. An apparatus according to claim 8, wherein said phase comparison means comprises a flip-flop circuit, said flip-flop circuit outputs signals which are respectively inverted in synchronism with each change point of the binarized reproduction signal and the sampling clock signal, and said phase comparison means compares pulse widths of the output signals from said flip-flop circuit and the predetermined pulse.

12. An optical information reproducing apparatus comprising:

means for reading out digital information recorded as an optical mark on an optical information recording medium as an information reproduction signal by scanning the recording medium with a light beam;

conversion means for converting the information reproduction signal into a binarized reproduction signal;

means for generating a first signal corresponding to leading and trailing edges of a change point of the binarized reproduction signal;

means for generating a sampling clock signal;

phase comparison means for detecting a phase difference between a signal obtained by delaying the first signal and the sampling clock signal; and means or reproducing the digital information by sampling the binarized reproduction signal with the sampling clock signal on the basis of a signal from said phase comparison means.

13. An apparatus according to claim 12, wherein a delay amount of the delayed signal is synchronized with the binarized reproduction signal, and is substantially ½ of a time required for optically scanning a minimum length of the optical mark.

14. An apparatus according to claim 12, further comprising a voltage-controlled oscillator for outputting a high-frequency signal corresponding to an integer multiple of the sampling clock signal, and the delay amount is set to be substantially ½ of a period of the sampling clock signal by counting the high-frequency signal in synchronism with the binarized reproduction signal.

15. An apparatus according to claim 12, wherein said phase comparison means comprises a flip-flop circuit, said flip-flop circuit outputs signals which are respectively inverted in synchronism with each change point of the binarized reproduction signal and the sampling clock signal, and said phase comparison means compares the output signals from said flip-flop circuit and the delayed signal.

16. An optical information reproducing method comprising the steps of:

reading out digital information recorded as an optical mark on an optical information recording medium as an information reproduction signal by scanning the recording medium with a light beam;

converting the information reproduction signal into a binarized reproduction signal;

generating a first signal corresponding to leading and trailing edges of a change point of the binarized reproduction signal;

generating a sampling clock signal;

generating a second signal which oscillates at a frequency at least twice a frequency of the sampling clock signal;

generating a phase advance signal indicative of a phase difference between the first signal and the second signal and a phase delay signal having a pulse width equal to the second signal; and reproducing the digital information by sampling the binarized reproduction signal with the sampling clock signal on the basis of the phase advance signal and the phase delay signal.

17. An optical information reproducing method comprising the steps of:

reading out digital information recorded as an optical mark on an optical information recording medium as an information reproduction signal by scanning the recording medium with a light beam;

converting the information reproduction signal into a binarized reproduction signal;

generating a first signal corresponding to leading and trailing edges of a change point of the binarized reproduction signal;

generating a sampling clock signal;

generating a first output indicative of a phase difference between the first signal and the sampling clock signal and comparing the first output with a second output which is a predetermined pulse; and reproducing the digital information by sampling the binarized reproduction signal with the sampling clock signal on the basis of a result of the comparing in said first output generating step.

18. An optical information reproducing method comprising the steps of:

reading out digital information recorded as an optical mark on an optical information recording medium as an information reproduction signal by scanning the recording medium with a light beam;

converting the information reproduction signal into a binarized reproduction signal;

generating a first signal corresponding to leading and trailing edges of a change point of the binarized reproduction signal;

generating a sampling clock signal;

detecting a phase difference between a signal obtained by delaying the first signal and the sampling clock signal; and reproducing the digital information by sampling the binarized reproduction signal with the sampling clock signal on the basis of a result of said detecting step.

* * * * *

UNITED STATES PATENT AND TRADEMARK OFFICE
CERTIFICATE OF CORRECTION

PATENT NO. : 5,499,226
DATED : March 12, 1996
INVENTOR(S) : Shinichi OHTA, et al.

It is certified that error appears in the above-indentified patent and that said Letters Patent is hereby corrected as shown below:

ON THE COVER PAGE,

Under "FOREIGN PATENT DOCUMENTS", item [56]:

"04341928   11/1992   Japan ." should read
--4-341928   11/1992   Japan .--.

COLUMN 3:

Line 31, "output Q" should read --output Q from--.

COLUMN 4:

Line 28, "10" should be deleted.

UNITED STATES PATENT AND TRADEMARK OFFICE
CERTIFICATE OF CORRECTION

PATENT NO. : 5,499,226
DATED : March 12, 1996
INVENTOR(S) : Shinichi OHTA, et al.

It is certified that error appears in the above-indentified patent and that said Letters Patent is hereby corrected as shown below:

COLUMN 9:

Line 57, "Generator" should read --generator--.

COLUMN 10:

Line 31, "12(*b*) of FIG. 12," should read --12(*b*),--.

COLUMN 15:

Line 1, "or" should read --for--.

Signed and Sealed this

Sixth Day of August, 1996

Attest:

BRUCE LEHMAN

Attesting Officer     Commissioner of Patents and Trademarks